(12) United States Patent
Ciurea

(10) Patent No.: US 8,600,875 B2
(45) Date of Patent: Dec. 3, 2013

(54) AUTHENTICATION PROCESS USING SEARCH TECHNOLOGY

(75) Inventor: Peter Ciurea, Orinda, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/084,426

(22) Filed: Apr. 11, 2011

(65) Prior Publication Data

US 2011/0258118 A1  Oct. 20, 2011

Related U.S. Application Data

(60) Provisional application No. 61/323,330, filed on Apr. 12, 2010.

(51) Int. Cl.
*G06Q 40/00* (2012.01)

(52) U.S. Cl.
USPC .............................................. 705/38; 705/35

(58) Field of Classification Search
USPC ...................................................... 705/38, 35
See application file for complete search history.

(56) References Cited

U.S. PATENT DOCUMENTS

| | | |
|---|---|---|
| 7,403,922 B1 | 7/2008 | Lewis et al. |
| 2002/0046191 A1* | 4/2002 | Joao .............................. 705/400 |
| 2003/0078877 A1* | 4/2003 | Beirne et al. ................... 705/38 |
| 2003/0083945 A1* | 5/2003 | Ng et al. .......................... 705/21 |
| 2005/0065959 A1 | 3/2005 | Smith et al. |
| 2006/0058011 A1* | 3/2006 | Vanska et al. .............. 455/414.3 |
| 2006/0226216 A1 | 10/2006 | Keithley et al. |
| 2007/0112667 A1* | 5/2007 | Rucker ........................... 705/38 |
| 2011/0047072 A1 | 2/2011 | Ciurea |

FOREIGN PATENT DOCUMENTS

| | | |
|---|---|---|
| WO | 01/37183 A1 | 5/2001 |
| WO | 2008/144643 A1 | 11/2008 |

OTHER PUBLICATIONS

Sullivan, Richard J; "Can Smart Cards reduce payments fraud and identity theft?"; Economic Review—Federal Reserve Bank of Kansas City; 2008.*

Wada, Hiroshi; Junichi; Oba, Katsuya; "A Model-Driven Development Framework for Non-function . . ."; International Journal of Web Services Research; Oct.-Dec. 2008.*

International Search Report and Written Opinion mailed Dec. 9, 2011, PCT Application No. PCT/US2011/032144, 10 pages.

* cited by examiner

*Primary Examiner* — Edward Chang

(74) *Attorney, Agent, or Firm* — Kilpatrick Townsend & Stockton LLP

(57) ABSTRACT

Systems and methods are presented for improved authentication and risk analysis processes using search engine technology. In one potential implementation, an authorization request message is received at a payment processing network as part of a transaction between a user and a merchant. The payment processing network analyzes risk based on a search history associated with the user involved in the transaction with the merchant. A response to the authentication request is made based in part on the risk associated with the user search history. In further embodiments, a user registers with a search engine as part of a service for improved authentication, where the user accepts privacy settings allowing storage of search and transaction data by a search engine server. The search engine server passes search and transaction data to a risk analysis server for creation of risk parameters which may be used to authenticate transactions.

20 Claims, 7 Drawing Sheets

AUTHENTICATION PROCESS USING SEARCH TECHNOLOGY

CROSS-REFERENCES TO RELATED APPLICATIONS

This application is a non-provisional of and claims the benefit of the filing date of U.S. Provisional Patent Application No. 61/323,330, filed on Apr. 12, 2010, which is herein incorporated by reference in its entirety for all purposes.

BACKGROUND

As e-commerce becomes a larger presence in the world economy, search data and advertising data related to e-commerce and user behavior around commerce purchasing and behavior in general has become more common, more readily available, and more valuable. Such data may be available for access or purchase through various sources such as independent data gathering services, through advertising systems that allow tracking of the acceptance of offers that are presented to a user, or online search engines.

Additionally, the vast majority of purchases that are made online are made by presenting an account number or payment card number. Large numbers of transactions occur daily through the use of payment cards such as credit cards, debit cards, and prepaid cards. Records of the transactions are recorded in databases for settlement and financial record-keeping and to meet the requirements of government regulations. Such data can be mined and analyzed for trends, statistics, and comparisons of users that have similar characteristics. Sometimes this type of data is mined for specific purposes, such as to analyze trends and patterns for prediction or analysis purposes.

A payment processing network can be a network that performs transaction processing such as payment processing for credit and debit card payments. It can provide authentication and verification functions. In many instances, a payment processing network can have a short period of time to complete an authorization for a transaction, even though it continuously processes large numbers of transactions. In spite of these demands, the increasing functionality and performance of computing systems may allow added functionality or support for other priorities within a payment processing network. Fraud detection and transaction authorization decision making are potential examples of additional functionality.

Fraud can occur when a number, identity, or other misappropriated information is used to initiate and complete a transaction. Although some methods of detecting fraud exist, theft and fraud in payment transactions continues to occur at a rate that reaches into the hundreds of millions and billions of dollars per year.

There is a need for improved methods of payment authentication and fraud prevention systems and methods. Embodiments of the invention address these and other problems.

BRIEF SUMMARY

Systems and methods for using search technology to authenticate transactions are disclosed herein.

According to one embodiment, a method includes receiving an authorization request to complete a transaction between a user and a merchant, accessing a database containing search history of the user, and determining whether the authorization request is associated with any of the searches belonging to the user in the search history.

Another embodiment is directed to a computer readable medium comprising code executable by a processor, the code for implementing a process according to the above-described method.

Another embodiment is directed to a system for implementing the above-described method wherein the system includes a search engine history database and a server computer.

Further details regarding embodiments of the technology are provided in the Detailed Description, claims and drawings.

DETAILED DESCRIPTION

Figure 1:
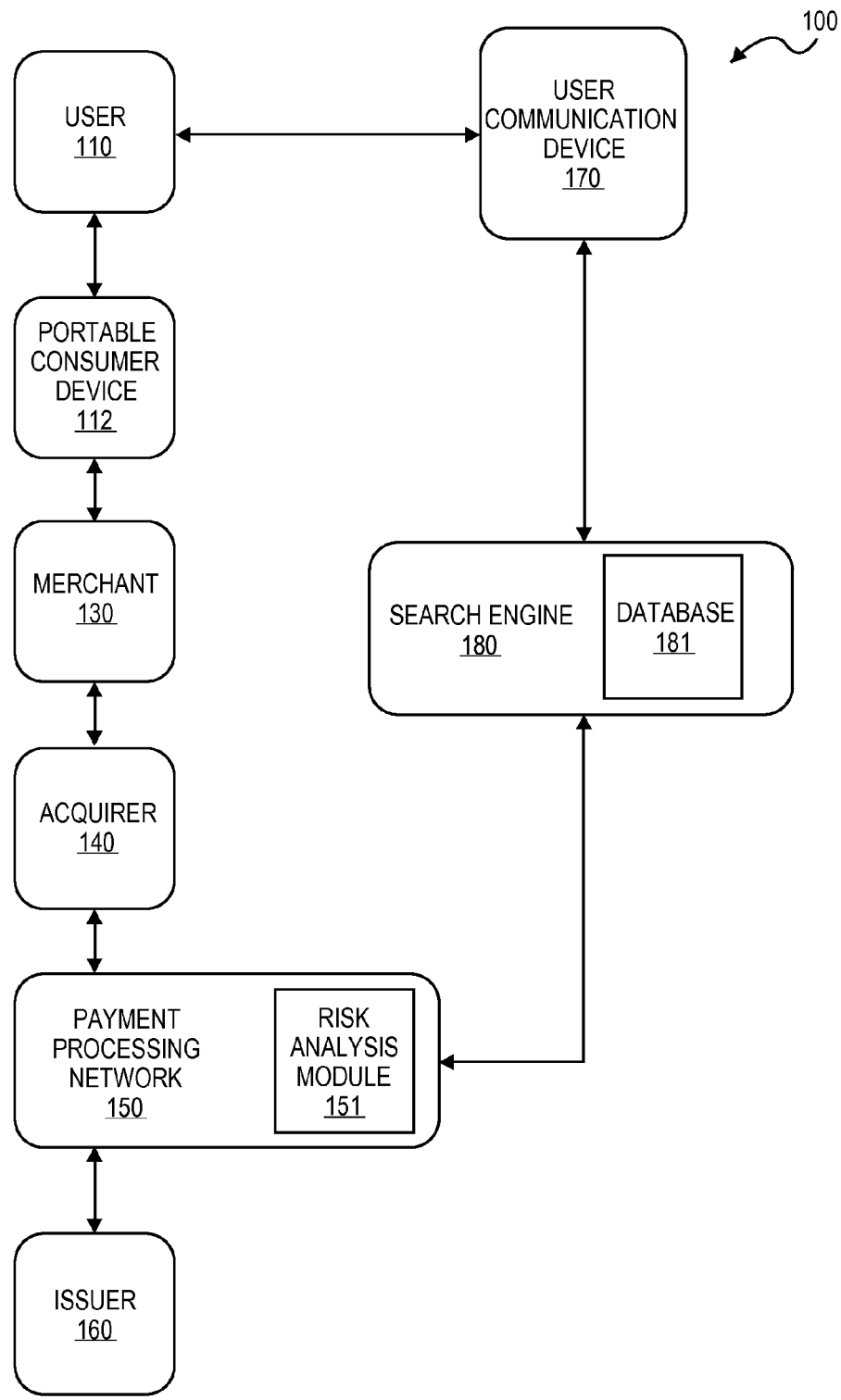
FIG. 1 shows a diagram of a system according to one potential embodiment of the innovations presented herein.

Embodiments of the invention disclosed herein include systems and methods for using search technology to authenticate transactions, to improve risk analysis associated with transactions, and to improve detection of fraud in a payment processing network.

In one potential embodiment, a user signs up for a service that may present the user with special offers. As part of the service, the user allows the service to track and store data related to the user's internet search history. User search data is stored in a database, and analyzed to identify information relevant to authentication of potential future transactions such as location data, merchant data, or merchandise that the user has expressed interest in through the search history. The analysis is used to update risk factors in a payment processing network. When the payment processing network later receives an authentication request, a risk associated with the transaction being authenticated may be adjusted based on the user search data.

In one specific non-limiting example, a user that is registered with a service according to an embodiment of the present innovations uses a home computer to search for information about vacations in Hawaii. The search information is transmitted to and stored in a search database. Later, when the payment processing network receives a payment authentication request originating from Hawaii, the risk associated with the transaction by the system is lowered based on the user search data.

Advantages of the present innovations include improved accuracy of risk calculations and analysis related to detecting fraud and responding to authorization request messages. Embodiments may be used either alone with search technology providing all of the risk analysis parameters, thereby providing a new type of analysis for authentication. Alternatively, risk analysis parameters associated with search technology may be used to improve previously known and used methods of analyzing risk by improving the accuracy of risk scores by providing an additional risk analysis parameter that may identify risks not captured by other risk analysis parameters in a system. Finally, an authentication process using search technology may enable more accurate associations to be created between user search data and user transaction data, thereby providing valuable information for determining how risk should be quantified for various types of transactions in ways that is not possible without user search data from search technology.

Illustrative embodiments will now be described. It is to be understood that while various structures are shown to explain the functioning of a system for authentication using search technology, the invention is not limited to the specific implementations described. In particular, although embodiments detail aggregation of user data at search engines, creation of risk analysis parameters at risk analysis servers, and authorization by issuers, any suitable server may perform any functionality described in the specific innovations. For example, a search engine and search history database may be part of a merchant server, an acquirer server, a payment processing network, or an issuer server. Similarly risk analysis parameters, risk scores, and authorization responses may be created by a merchant server, an acquirer server, a payment processing network, or an issuer server.

I. Payment Processing System with Authentication and Risk Assessment

FIG. 1 illustrates system 100 for using search technology to authenticate transactions and improve risk analysis according to one potential non-limiting embodiment of the invention. System 100 includes user 110, portable consumer device 112, user communication device 170, acquirer 140, payment processing network 150, risk analysis module 151, issuer 160, search engine 180, and search engine database 181. It is understood, however, that embodiments of the invention may include more than one of each of these components. In addition, some embodiments of the invention may include fewer than all of the components shown in FIG. 1. Also, the components of FIG. 1 may communicate via any suitable communication medium, including the Internet, using any suitable communication protocol.

As part of a transaction or communication structure according to embodiments of the present innovations described by FIG. 1, user 110 may interact with merchant 130 using portable consumer device 112. Merchant 130 is in communication with acquirer 140. Acquirer 140 is in communication with issuer 160 through payment processing network 150. User 110 may also interact with search engine 180 using user communication device 170. Search engine 180 is in communication with payment processing network 150.

Prior to discussing further specifics of embodiments of the invention, a further description of some terms including terms associated with FIG. 1 can be provided for a better understanding of embodiments of the invention.

"Risk" as described herein refers to an expected likelihood or probability associated with a current or future event. In one potential embodiment, risk refers to a likelihood that a current transaction is fraudulent, or being presented by a person or device not authorized to engage in the transaction. In an alternative embodiment, risk may refer to a probability that a credit account will receive payment in the future for an amount advanced as part of a currently occurring transaction. In a further alternative embodiment, risk may refer to a possibility that a transaction result in a charge-back where an amount paid to a merchant must be returned from the merchant to a user account.

A "risk analysis parameter" may be any value, variable or other type of parameter which is used to quantify risk. For example, a risk analysis parameter that directly quantifies risk may be a credit score, a percentage probability associated with a risk, or a number on an abstract or non-linear risk scale. A risk analysis parameter may also be used to indirectly quantify risk, where additional information is required before the meaning of the risk analysis parameter becomes clear. Such an indirect risk analysis parameter may be one variable in a multi-variable risk equation, or a parameter which relies on the occurrence of a subsequent event to quantify a risk. An example of this is a search related to a particular location, where a risk can later be quantified based on a transaction occurring at particular location related to the search. Further examples of risk analysis parameters are discussed below.

A "user" such as user 110 can be an individual or organization such as a business that is capable of purchasing goods or services or making any suitable payment transaction with merchant 130. In some embodiments, a user may further be referred to as a cardholder or account holder, and can refer to a consumer who has an account with an issuer that can be used to conduct transactions with merchants. A cardholder may have one or more portable consumer devices associated with the account, such as a credit card, debit card, mobile phone, etc., that can assist in the use of the account to conduct a transaction.

A "user communication device" such as user communication device 170 can be any suitable device that allows user 110 to interact with search engine 180. User communication device 170 may be in any suitable form. For example, user communication device 170 can be a personal computer, personal digital assistant, mobile telephone, and the like. In certain embodiments, a user communication device may be embodied in the same device as a portable consumer device. For example, a phone with a payment application can be used as both a portable consumer device to pay for goods and services, as well as a user communication device to allow a user to communicate.

A "portable consumer device" such as portable consumer device 112 can be any suitable device that can be used to conduct a payment transaction with merchant 130. Portable consumer device 112 may be in any suitable form. For example, suitable portable consumer devices 112 can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices 112 include cellular phones, personal digital assistants (PDAs), pagers, payment cards, security cards, access cards, smart media, transponders, and the like. In some cases, portable consumer device 112 may be associated with an account of user 110 such as a bank account.

A "merchant" such as merchant 130 can offer goods or services to a user 110. Merchant 130 may use any suitable method to conduct a payment transaction with the user. For example, merchant 130 may use an e-commerce business to allow the payment transaction to be conducted by merchant 130 and user 110 through the Internet. Other examples of merchant 130 include a department store, a gas station, a drug store, a grocery store, or other suitable business. In some embodiments, a merchant may operate a merchant server that is a computing device as described below. A merchant server can be used to provide an online storefront for consumers to shop and also to conduct online transactions with consumers once the consumers have decided to purchase goods from the merchant.

An "acquirer" such as acquirer 140 can be any suitable entity that has an account with merchant 130 and that processes merchant transactions associated with merchant access device 131. For example, acquirer 140 may be a bank.

An issuer such as issuer 160 can be any suitable entity that may open and maintain an account associated with user 110. For example, issuer 160 may be a bank, a business entity such as a retail store, or a governmental entity that issues a payment account to user 110. In some embodiments, issuer 160 may also be the acquirer 140. Issuer 160 may also issue portable consumer device 112 that is associated with an issued account.

A "payment processing network" such as payment processing network (PPN) 150 can be a network of suitable entities that have information related to the account associated with user 110 and issued by issuer 160. This Information includes profile information and other suitable information that may be used to complete a transaction between user 110 and merchant 130 involving the account.

Payment processing network 150 operates risk analysis module 151 and may also include a database (not shown). The database may include any hardware, software, firmware, or combination of the preceding for storing and facilitating retrieval of information. Also, the database may use any of a variety of data structures, arrangements, and compilations to store and facilitate retrieval of information. Risk analysis module 151 may be incorporated as part of a server or group of servers comprising payment processing network 150. In alternative embodiments, risk analysis module 151 may be structured as a separate server or group of servers. Risk analysis module 151 may be coupled to the database and may include any hardware, software, other logic, or combination of the preceding for servicing the requests from one or more client computers. Risk analysis module 151 may comprises one or more computational apparatuses and may use any of a variety of computing structures, arrangements, and compilations for servicing the requests from one or more client computers.

Payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. Payment processing network 150 may use any suitable wired or wireless network, including the Internet. Payment processing network may further include components such as an access control server, which can be a server computer that provides issuers, or other entities with the ability to authenticate consumers during an online transaction.

In some embodiments, the payment processing network 150 may include an authentication history server. An authentication history server can be a server which can receive and archive the result of authentication attempts in an authentication system. An authentication history server may record both successful and unsuccessful authentication attempts using particular account numbers or other related details. An authentication history server may receive data relating to authentications from issuers, payment processing networks, or any other entity involved in the authentication process. The data stored by the authentication history server can later be analyzed for various purposes. Alternatively, such information may be routed to a risk analysis server and can be combined with other information for risk scoring and fraud detection.

In some embodiments, the payment processing network 150 may include a directory server that can refer to a server computer that can be used to route messages containing enrolment and authentication information between a merchant plug- or an access control server. The directory server can also determine whether a consumer can utilize the authentication services and can apply business rules to modify the response to a merchant plug in. In some embodiments, the directory server can be operated by a service organization such as Visa. Alternatively, the above discussed portions of payment processing network 150 may be created as part of alternative networks coupled to payment processing network 150. Further embodiments may have various combinations or multiple copies of the above network elements, or may not include all of the above network elements.

II. Search Engines and User Search Data

A "search engine" such as search engine 180 can include a combination of hardware and software that can at least provide websites or interfaces that allow users to submit a query that results in a list of websites or content sites that match terms in the query. A query can be a single word, part of a word, or long groups of words with search operators. Examples of Search engines include, Google.com™, Yahoo.com™, and Bing.com™. The search engine 180 may include a search engine server computer. Alternatively, search engine 180 may include a custom search bar that includes an interface with a database for storing user search data for later analysis. Search engine 180 may also include a database 181 that serves as a search engine history database by storing the search queries submitted by users. The database may function using any hardware, software, firmware, or combination of the preceding for storing and facilitating retrieval of information. Also, the database may use any of a variety of data structures, arrangements, and compilations to store and facilitate retrieval of information. Search engine 180 may operate using web crawling, indexing, and searching as described below.

Web search engines may work by storing information about many web pages, which they retrieve from HTML. These pages are retrieved by a web crawler, which is sometimes also known as a spider. A web crawler is an automated web browser which follows found links on the site. Some discovered information may be excluded, but in general, a web crawler identifies all the discovered information. The contents of each page are then analyzed to determine how the page should be indexed. For example, words may be extracted from the titles, headings, or special fields called meta data tags. Data about web pages may be stored in an index database for use in later queries. The purpose of an index is to allow information to be found as quickly as possible. Some search engines, such as Google™, store all or part of the source page as a cache along with information about the web page, whereas other search engines, such as AltaVista™, store every word of every page they find.

When a user enters a search term into a search engine, the engine examines its index and provides a listing of best-matching web pages according to its criteria, usually with a short summary containing the document's title and sometimes parts of the text. The index is built from the information stored with the data and the method by which the information is indexed. Most search engines support the use of Boolean operators AND, OR and NOT to further specify the user search information. Boolean operators are for literal searches that allow the user to refine and extend the terms of the search. The engine looks for the words or phrases exactly as entered. Some search engines provide an advanced feature which allows users to define the distance between keywords. There is also concept-based searching where the research involves using statistical analysis on pages containing the words or phrases you search for. As well, natural language queries allow the user to type a question in the same form one would ask it to a human. A site like this would be Ask.com™.

"User search data" may, in some embodiments, include the search terms described above, and any operators used in conjunction with the search terms. In alternate embodiments, user search data may include key results, or user responses to such results, such as selection of a search result. Additional user search data may record or analyze the amount of time spent observing a search result, while filtering out instances where a user has simply walked away from a result while leaving the result selected on a viewing output screen. User search data may further include a record of links selected by a user during a browsing session, or a record of links presented to the user and not selected by the user.

In some embodiments, user search data may additionally include data which is calculated from the above described types of data or which is merged with other data not coming directly from a user. For example, user search data stored in a database may include multiple keyword searches. Additional user search data may be calculated from the database record of user search data by, for example, calculating the average number of times per month a user uses a particular keyword. Similarly, by using outside contextual information, the keyword searches might be categorized by market or by broad service areas, and an average number of times per month a user makes a search related to a particular market or broad service area might be calculated.

The overall usefulness of a search engine depends on the relevance of results. How a search engine decides which pages are the best matches, and what order the results should be shown in, varies widely from one engine to another. The methods also change over time as Internet usage changes and new techniques evolve. There are two main types of search engine that have been created. The first is a system of predefined and hierarchically ordered keywords that have been structured programmed extensively with input. The other is a system that generates an inverted index by analyzing texts it locates. This second form relies much more heavily on the search engine server and computing analysis to do the bulk of the work.

A search engine such as search engine 180 may be integrated with additional advertising that financially supports the system. In some embodiments, advertisers may pay to have listing ranked higher, or to have listings ranked in a more prominent result location that may be separate from other results. Alternatively, a search engine which does not accept payment for their search engine results may include systems and methods for running search related advertisements beside regular search results. In certain embodiments, user search data may include a history of advertisements presented to the user, premier search results, or other search result data and a record of how the user responded to the advertisement or search result.

Various embodiments of the innovations presented herein may use any of the search engine structures or functions presented above, or any other suitable search structure to create user search data for use in systems and methods of improved authentication of payment transactions.

III. Authentication and Risk Assessment Using Search Technology

Prior to a transaction, user 110 may complete searches for details about goods or services by using user communication device 170 to interact with search engine 180. Database 181, operated by search engine 180, stores all or selected portions of the search history associated with user 110 including which goods or services user 110 searched for information about.

During a payment transaction using search technology for authentication, user 110 purchases goods or services using portable consumer device 112 issued to user 110. The user 110 takes his portable consumer device 112 and passes it by a reader in an access device at the merchant 130. Alternatively, user 110 may input a card number with a card verification value (CVV) and transmit the number to the merchant 130 via a network. The merchant 130 access device then generates an authorization request message, which is sent to the payment processing network 150 via the acquirer 140. The authorization request message can contain information such as the amount of the purchase as well as a merchant identifier indicating the identity of the merchant. When payment processing network 150 receives an authorization request to process the transaction, payment processing network 150 determines whether the transaction is associated with any of the previous searches user 110 completed with search engine 180.

Risk analysis module 151, which may be part of payment processing network 150, may communicate with database 181 to retrieve some or all of the searches completed by user 110. After determining whether the transaction is associated with any of the previous searches completed by user 110, payment processing network 150 may generate a risk parameter (e.g., a risk analysis parameter) indicating how much association there is between the purchase being made and the previous searches of user 110. Payment processing network 150 then sends the risk analysis parameter along with the authorization request to issuer 160.

For example, if the user 110 searched for computers at a specific merchant, and if within a limited time frame, the user 110 attempts to purchase a computer, the payment processing network 150 will generate a risk analysis parameter based on the previous searches completed by the user 110. When the payment processing network 150 receives an authorization request message from the specific merchant or from a different merchant related to the attempted purchase of the searched product, the risk analysis module 151 will access the database 181 to determine if there is any correlation between the attempted purchase and the previous searches completed by user 110. The payment processing network 150 will generate a risk analysis parameter, based on the level of correlation, and send it along with the authorization request message to the issuer 160.

A "risk analysis parameter" may be a risk score that provides the issuer 160 or any other party with a quantitative value of a risk associated with the transaction. The risk score can be in any suitable form and can be a number (e.g., from 1-10, or from A-Z) which indicates the level of risk that the transaction is not authentic. For example, a score of 10 may indicate high risk, whereas a score of 1 may indicate low or no risk. In addition to being a direct and linear representation of risk, a risk analysis parameter may be a non-linear indicator of risk, such as a parameter with a score of either 1 or 0 indicating a transaction should be approved or disproved. Alternatively, a risk analysis parameter may be one parameter of a plurality of parameters that is used as part of a calculation, equation, or table to arrive at a final risk score, with the final risk score being a type of risk analysis parameter which is directly used to determine whether a response to an authorization request is positive or negative.

In one embodiment, certain conditions may indicate if a risk analysis parameter will be generated. Such a condition may include the amount of the transaction. For example, if the transaction amount is less than $30, payment processing network 150 may not access database 181 and may skip the step of generating a risk analysis parameter. Instead, payment processing network 150 may immediately forward the authorization request to issuer 160.

Upon receiving the authorization request message, issuer 160 generates an authorization response message that indicates whether the transaction is approved or declined. In one embodiment, issuer 160 uses the analysis parameter as a factor in determining whether the transaction is approved or denied. The authorization response message is sent to payment processing network 150. Payment processing network 150 sends the authorization response message to the merchant 130 via the acquirer 140.

In one embodiment, portable consumer device 112 has a unique characteristic, and database 181 identifies the search history associated with user 110 using that unique characteristic. For example, portable consumer device 112 may have a unique account number that database 181 uses to identify all searches belonging to user 110.

Figure 2:
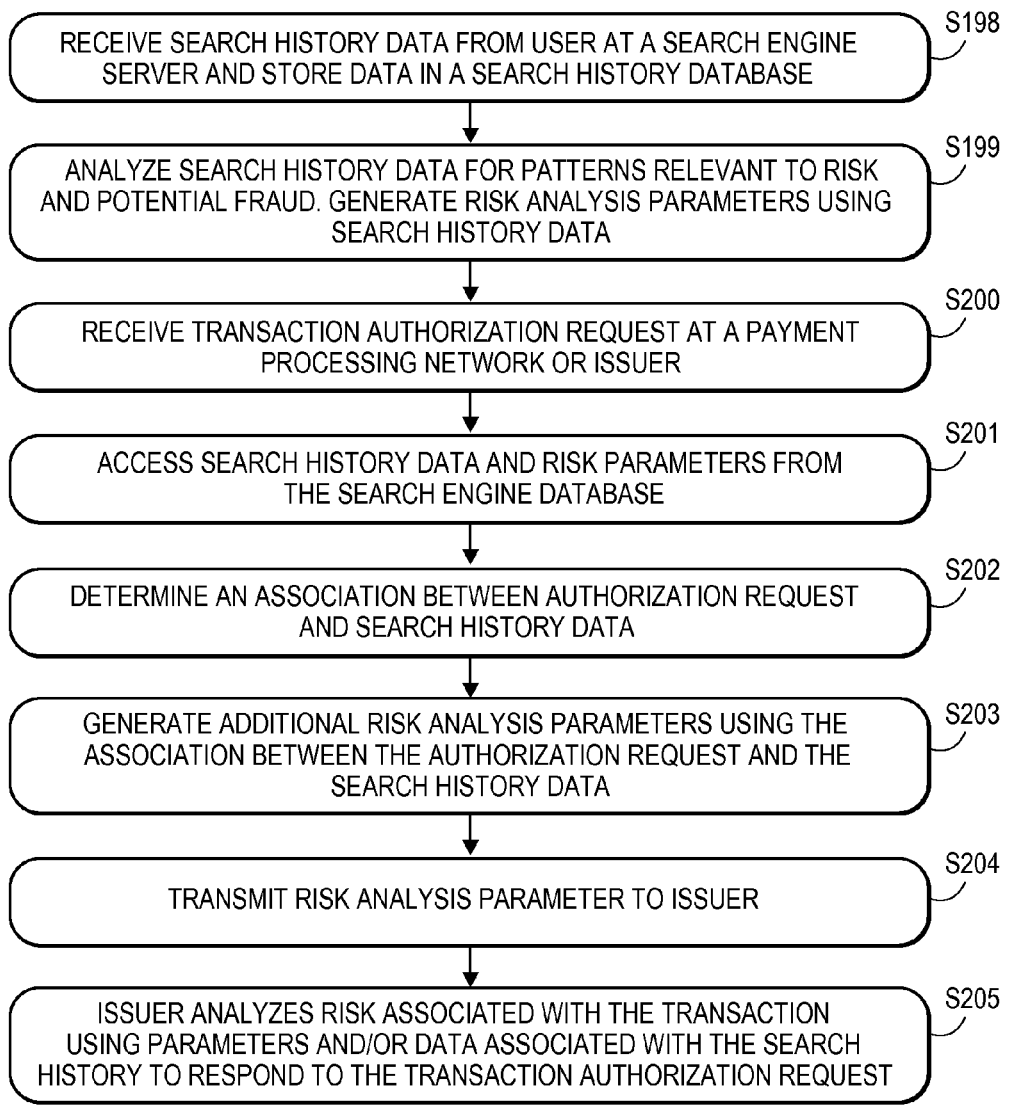
FIG. 2 shows a flowchart illustrating one potential embodiment of the innovations presented herein.

FIG. 2 is a flowchart that illustrates one method for processing using search technology to authenticate a transaction in a system such as system 100 of FIG. 1. Alternatively, other embodiments other than the system of FIG. 1 may be used. In one potential embodiment, the search engine 180 receives a search request from user communication device 170, and stores the search request as user search data in database 181 as part of step S198.

Search engine 180 may then optionally further analyze the accumulated search history data for patterns relevant to risk and potential fraud, and may generate risk analysis parameters using the search history data in step S199. In alternate embodiments, search engine 180 may merely communicate user search data without performing an analysis to derive risk analysis parameters. In other alternate embodiments, search engine may derive risk analysis parameters from user search data and calculate one or more risk scores for communication to a party that is responding to an authorization request message.

At a later point in time, a user 110 conducts a transaction with a merchant 130. An authorization request message may be generated by a merchant server computer or a merchant access device operated by the merchant 130. It may then be sent to the payment processing network 150 via the acquirer 140. Payment processing network 150 receives an authorization request message to complete a transaction between user 110 and merchant 130 as part of step S200.

An "authorization request message" may be a message that includes an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. It may include data elements including an account number including a BIN (bank identification number), a service code, expiration date, and verification values (e.g., a CVV value).

In step S201, risk analysis module 151, which may be part of payment processing network 150, accesses database 181 via search engine 180 to retrieve either the search history data or search parameters from searches user 110 previously completed using search engine 180. In other embodiments, a search is not required, and the search engine 180 may periodically send search data to the payment processing network 150 for storage.

In step S202, payment processing network 150 then determines if the goods or services being purchased in the transaction are associated with the searches user 110 previously completed. This association may be a direct association where the user has searched for a specific item or searched the website of a specific merchant. Alternatively, a type of replaceable or interchangeable good may be identified, and an association may be made where the search is for a similar or related good or service that is not exactly the same as the good or service being purchased. Another type of association may be an association of geographic area. For example, map or driving direction searches may be associated with a specific merchant, or with merchants located within a general area. A subsequent purchase at a merchant within the vicinity of a searched area, may indicate that the transaction risk is low.

Following this, payment processing network 150 then generates a risk analysis parameter or incorporates the risk analysis parameters from search engine 180 with new parameters that use specific information from the authorization request. These parameters indicate the amount of risk associated with the transaction as step S203 of the process of FIG. 2. The authorization request message is then modified by a server computer in the payment processing network 150. It may include a risk parameter or multiple risk parameters. The modified authorization request message comprising the one or more risk parameters is then sent to issuer 160 in step S204.

The issuer 160 may then approve or decline the transaction based on the received risk parameter, and other information (e.g., whether or not there are sufficient funds or credit in the account). Then, at the end of the day, a clearing and settlement process can occur between various issuers and acquirers in communication with the payment processing network 150.

In one embodiment, the risk analysis parameter may be a numerical value ranging from 0 to 100 wherein 100 indicates a high amount of risk and 0 indicates a low amount of risk. The larger the number of matches between the goods or services being purchased in the transaction and the goods or services user 110 searched for information about using search engine 180, the stronger the association and the lower the risk. For example, if none of the goods being purchased in the transaction are found in the user's search history, a high numerical value may be assigned indicating there is little association between the current transaction and the user's previous searches. That may indicate a lower likelihood that the person using the portable consumer device is not user 110, the person to whom portable consumer device 112 was issued.

In another embodiment, the risk analysis parameter may be a Boolean value. If user 110 did not previously search for each good or service being purchased in the transaction, the Boolean value may be set to true indicating there is a risk. Such a parameter may be beneficial when, for example, user 110 always searches information about good or services before purchasing them. In that case, if the search history does not contain a search on each good or service being purchased in the transaction, that may be considered an indication that the person using the portable consumer device is less likely to be user 110, the person to whom portable consumer device 112 was issued. In further embodiments, the risk analysis parameter may be incorporated with additional risk factors unrelated to search history to create an overall risk parameter associated with a user or transaction.

Figure 3:
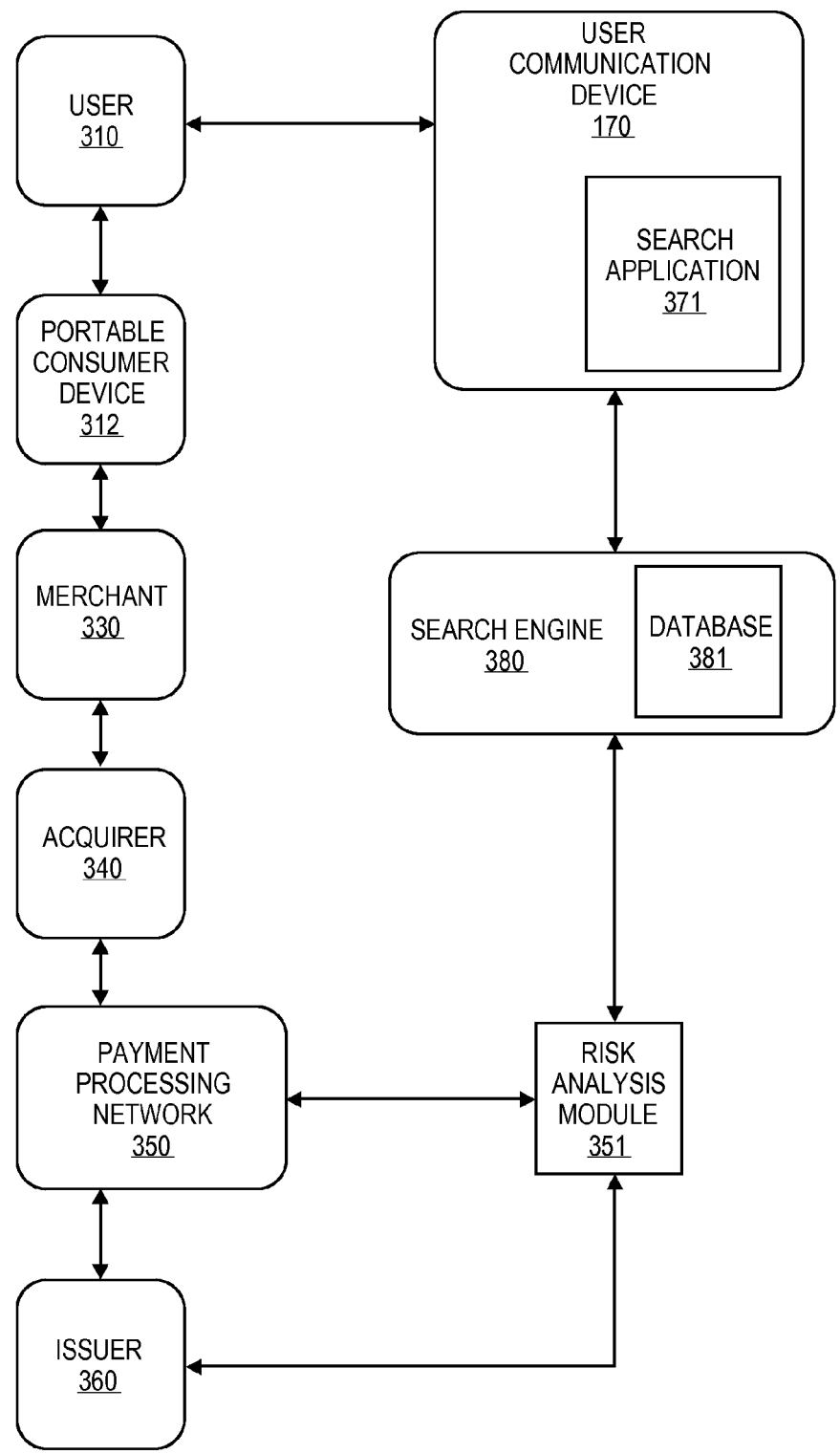
FIG. 3 shows a diagram of a system according to one potential embodiment of the innovations presented herein.

IV. Further Embodiments of Authentication and Risk Assessment Using Search Technology FIG. 3 illustrates an alternative embodiment of a system for using search technology to authenticate transactions according to one potential embodiment of the invention. The system of FIG. 3 includes user 310, portable consumer device 312, user communication device 370, search application 371, acquirer 340, payment processing network 350, risk analysis server computer 351, issuer 360, search engine 380, and search engine database 381. Just as above for the system of FIG. 1, it is to be understood, that embodiments of the invention may include alternative structures and arrangements in accordance with the innovations presented herein, including more than one of each of these components, and embodiments where one or more of the components may be missing. Also, the components of FIG. 1 may communicate via any suitable communication medium, such as the Internet, using any suitable communication protocol.

FIG. 3, in addition to having elements with corresponding elements with similar description and function to elements in FIG. 1, includes search application 371. Search application 371 may be a software program downloaded to a personal computer, may be plug-in functionality integrated with a web browser operating on a personal computer, or may be any other localized function or portion of a function that enables user communication device 370 additional functionality or efficiency.

In one potential embodiment, search application 371 is a computer program downloaded to user communication device 370 following registration with a service that includes improved authentication and risk analysis using search technology. Application 371 may include a search input bar, a history of recent searches, and a display area for displaying search results. Application 371 may further include a promotional display area that may display specialized promotions from the service that the user is registered with, or message from the service. Application 371 may further include a temporary storage structure for storing search text input by a user, search results viewed by a user, or additional browsing history that may comprise a search that does not necessarily include a keyword search. Such a browsing search history may involve clicking on predetermined web links, and following a chain of web links. In this way, the user search data may simply be made up of identification and classification data for a plurality of websites selected by user clicks. Search application 371 may include functionality for determining merchant, merchandise, or location data from the chain of selected links rather than merely from a list of input key word searches.

Search application 371 may further include application customization settings, such as privacy settings that impact privacy levels associated with different services. For example, the user may elect to exclude certain types of searches from the system. Alternatively, the user may elect to allow certain types of advertising or special offers to be presented through direct advertising or through sponsored search results. The user may elect levels or types of personal information that may be used to present such advertising or results. The user may further elect a variable time that the system may keep and analyze search data. For example, a user may select a one month storage limit on search data, with an indication that after one month, any stored search data will be deleted not only from any backup storage in application 371, but from any storage database anywhere in the system. Alternatively, the deletion settings may be based on a statistical characteristic of the user search data such as the variation or distribution of history data over time.

Any customization setting, along with search data, can be sent to search engine 380, which may include database 381. Database 381 includes a record of searches conducted by the user 310. The searches stored in database 381 may be time limited in their coverage as discussed above, such that customization settings set by a user may direct search data to be deleted from database 381 after a certain amount of time. Alternatively, database 381 may simply reduce the amount of detail stored for older searches by, for example, only storing aggregate search data, or more general information about a search. For example, a database input detailing a search for a gray wool sweater at 7:15 PM on March 15 at the website of a specific merchant may be reduced to a database input indicating that the user searches for articles of clothing an average of 9.7 times per month.

Certain embodiments of search engine 380, then, collect search information from user 310 via search application 371 on user communication device 370, and then perform analysis of the data in database 381 as described above, for example by calculating average search frequency by good or service type. In alternative embodiments, such analysis may be performed by risk analysis server computer 351 or by a computing system that is separate from the system displayed in FIG. 3. Risk analysis server 351 may then request either details of specific searches, or calculated details related to search information from user 310. In one potential embodiment, risk analysis server 351 calculates a risk score using search data from database 381 and other generally known risk related information. This information is then passed to the payment processing network 350 or the issuer 360 such that when an authorization request message is received for a specific transaction, there is no delay in using the risk score to influence the response to the authorization request message.

In alternative embodiments, the risk score may be based not only on the search history data and the generally known risk related information, but also on information for the specific transaction associated with the authorization request. In such an embodiment, the transaction details may be passed to risk analysis server 351 from payment processing network 350, and the authorization request may then be passed with an updated risk score either directly from risk analysis server 351, or from risk analysis server 351 to issuer 360 via payment processing network 350.

The specific transaction related data and the generally known risk related information may be risk information known about all users of a payment processing network, not just users that are registered with a system for improved authorization using search technology. The risk analysis can be further based on an analysis of the risk of the transaction such as first time buyer, large ticket size, type of goods information. The analysis may further be based on potentially other factors such as a non-US IP address, high risk merchant categories, high risk merchandise type categories, geo-location of device used to initiate the purchase, frequency, time of day, out-of-pattern purchasing, or other categories. A variety of static, semi-dynamic, and dynamic analysis can be used without the need for the cardholder to enroll into the program, and additional data related to search results may be added to such analysis when a user does enroll in the program. Additionally, there are many flexible implementation options that can be adjusted based on factors such as the location of the merchant or the location of the cardholder. These or various combinations of these with other factors may all be included with a score that is based on search history data.

In a more concrete example of how search data may be used to influence a risk score, a transaction may be conducted by a person at jewelry store 50 miles from his home location in Los Angeles. If search data is not used as an input to a risk parameter, the risk score might be "5" on a scale of "1" to "10", with "1" being low or no risk and "10" being high risk. If the user's search history indicates that the user has not searched for jewelry in the past year, and has searched for items such as sports teams, motorcycles, and powerboats, the user's profile may not be consistent with a consumer that purchases fine jewelry. Thus, the risk score might be adjusted to a "7" with the search history data, indicating that a higher risk is present. Conversely, if the user did search for jewelry in the past week, then the risk score might be reduced to "3" indicating that it is likely that the user was looking to buy fine jewelry.

As illustrated by this example, various aspects of search data can be used to adjust risk parameters. For instance, user search data can be used to create spending profiles of consumers, can be mined to determine what specific merchants, products, or locations the user is interested in, etc.

Figure 4:
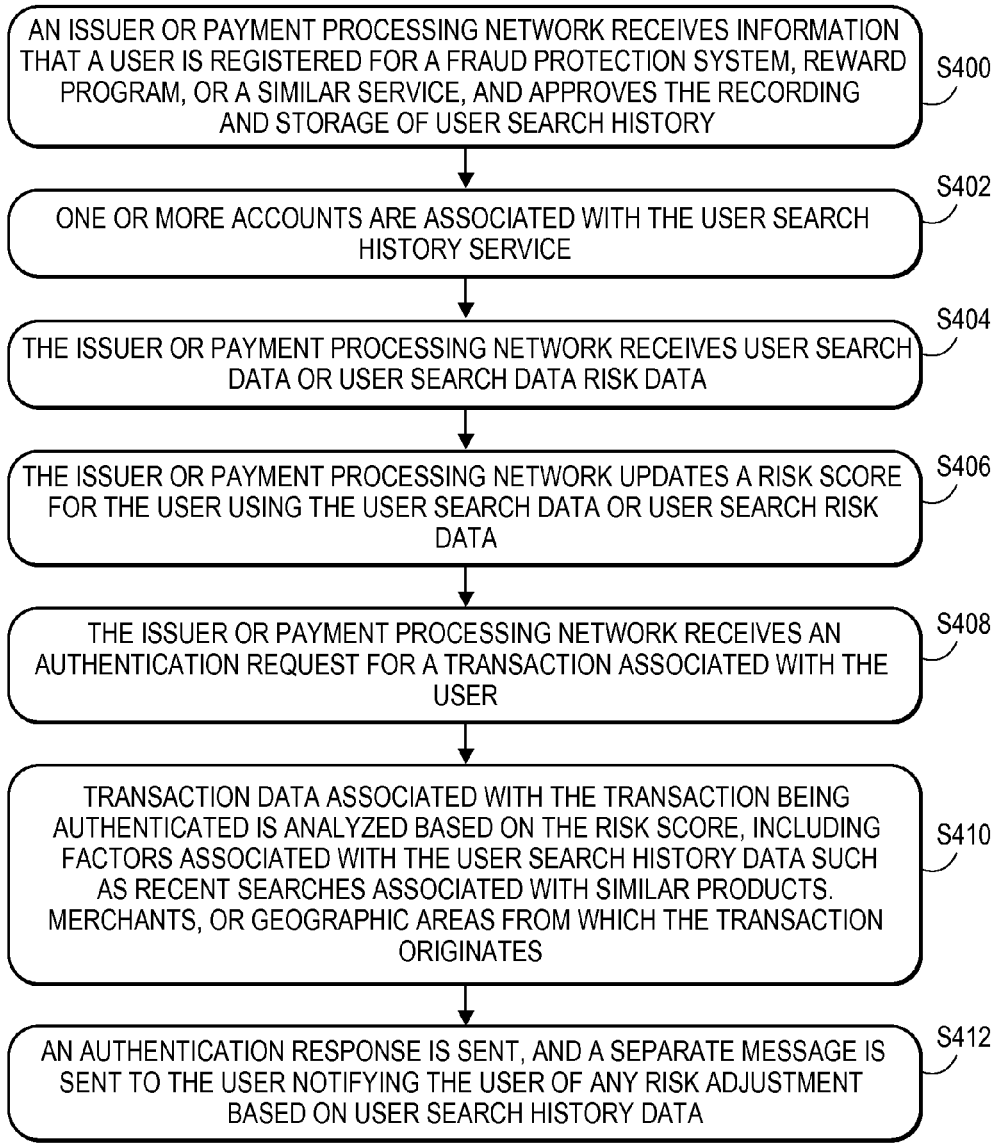
FIG. 4 shows a flowchart illustrating one potential embodiment of the innovations presented herein.

FIG. 4 illustrates an additional alternative embodiment of a method of authenticating a transaction using search data. In FIG. 4, an issuer or payment processing network operates a service that uses user search data to improve authentication and fraud detection.

As part of such a service, a registration is created for a user 310. The registration may be created at a specialized registration server. Alternatively, as part of the registration, the user 310 accesses search engine 380 or some other server to register with the system. Information provided as part of registration may include a user name, address, and contact information. Registration information may alternatively involve providing an account number such as a credit card number, a debit card number, a prepaid card number, or a checking account number. Registration may further involve a user entering information to identify one or more user communication devices such as user communication device 371 that allows an association to be created between the user communication devices, the later created user search data, and user transaction data associated with the provided account number. Alternatively, the user may provide authorization for the system to collect identifying information such as an IP address or multiple IP addresses associated with the user communication devices. In further embodiments, the registration process may place a cookie or enable a software based tracking method to identify when user searches and related user search data is associated with a particular user. The registration process may enable such tracking on multiple user communication devices by providing login information to a tracking server or the registration server to allow the user to log in to the system to allow searches to be tracked from any user communication device.

Registration may involve downloading and installation of search application 371 on user communication device 370. The search application 371 may enable tracking and association of user search data with a particular user by use of a login or an input selection to self identify different users. In addition to providing a means for associating specific users with user search data, a search application 371 may provide additional functionality such as improved search functionality, storage of recent search results, presentation of special offers to users, or any other such functionality.

As part of step S400, the issuer 360 or payment processing network 350 receives notification that the user 310 has registered with the service for using search data to authenticate transactions. The notification may include an approval for the recording and storage of the user's search history as a waiver of any privacy rights associated with use of the data for authentication and any other related uses.

In step S402, one or more accounts are associated with the user search history service, as a way to access the user search data in conjunction with later occurring transactions. When the issuer 360 or the payment processing network 350 receives user search data or user search risk data in step S404, that data may be stored with or further associated with the related accounts. The user search data is then incorporated to update a risk score associated with the related account in step S406. Such an update may occur at predetermined intervals, such as a low usage time for the system once a day in the early morning. Alternatively, such updates may occur as search data or batches of search data are received from user communication device 370 and search engine 380.

At some point in time, a transaction is conducted by the user 310 at the merchant 330. The merchant 300, or its access device or merchant computer, then generates an authorization request message.

In step S408, the authentication request message then passes to payment processing network 350 via acquirer 340, and then to issuer 360. When an authorization request message is received by the payment processing network 350, transaction data associated with the transaction is analyzed. The risk update may involve merging or correlating the transaction data with user search data or risk analysis parameters or may simply be an adjustment on a risk score derived from the user search data. The transaction data is then analyzed based to create a risk score, and the risk score may take the user's search history and other risk factors into account. Such other factors may be based, for example on merchant type, merchant location, product type, transaction origination location, or other such factors.

The authorization request message can then be modified to include the risk score, along with other data including a transaction amount, primary account number, and verification values. The modified authentication request message is then sent to the issuer 160 so that the issuer can approve or deny the transaction. The issuer can approve or deny the transaction based upon a number of factors including the amount of funds or credit in the account that is used to conduct the purchase transaction, as well as the received risk score.

After the issuer 160 determines whether or not to authorize the transaction, an authorization response message to the transaction authentication can then be passed back to the merchant 300 via the payment processing network 350 and the acquirer 340.

In certain embodiments, the system may be further configured to notify the user of the basis for rejecting an authentication request as step S412 in FIG. 4. If a rejection is based on user search data, an alert message may be sent to user communication device 370 with details of reasons for the rejection. Alternatively, if a transaction was authenticated that may have alternatively been rejected, a message may also be sent to user communication device 370 detailing the search history associated with the purchase by the system. Such a follow up message may further include additional advertising or promotional offers based on the transaction associated with the authentication.

At the end of the day, a clearing and settlement process can occur to settle transactions conducted with various issuers and acquirers.

Figure 5:
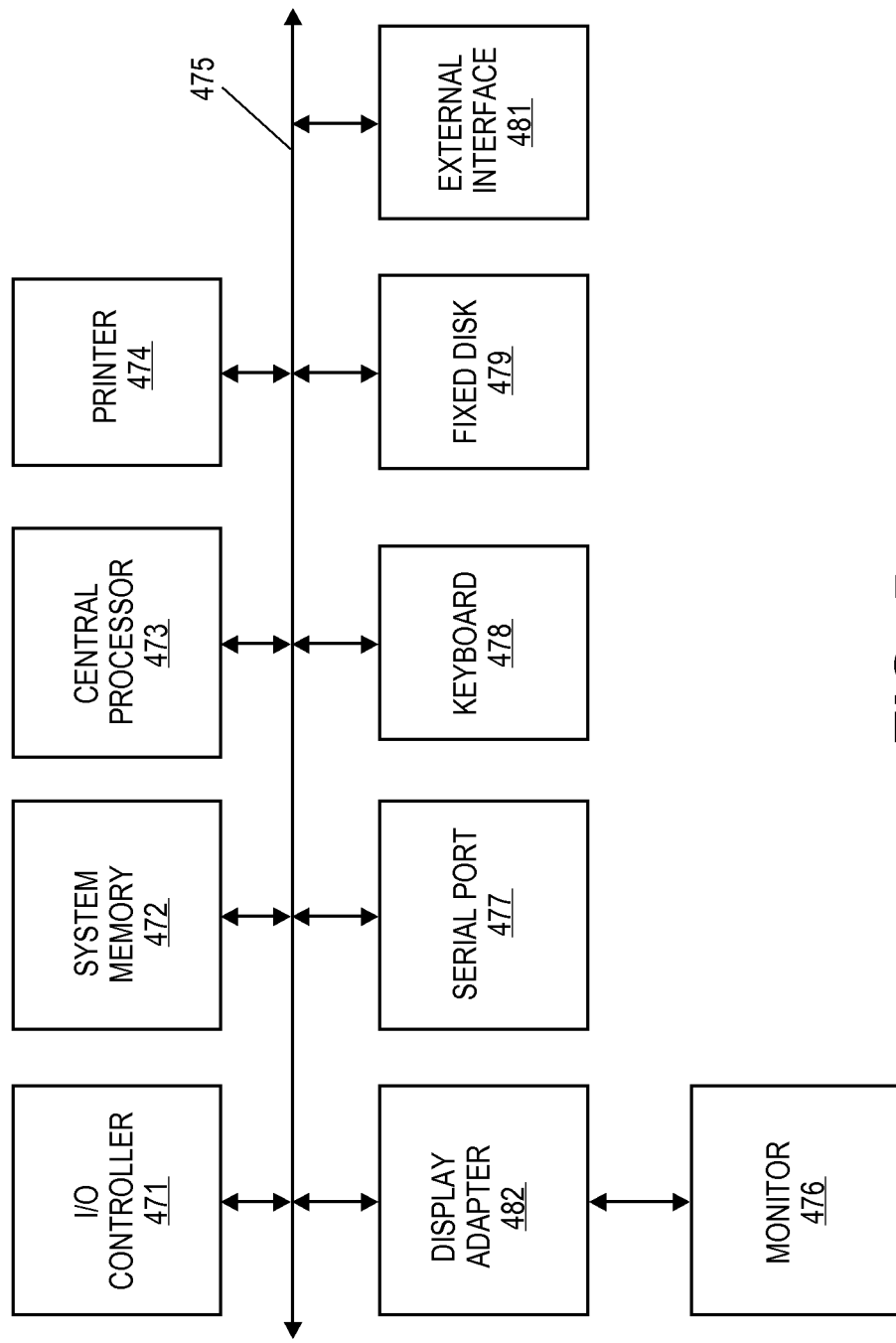
FIG. 5 shows a high level block diagram of a computer system that may be used to implement any of the entities or components described below according to an embodiment of the invention.
Figure 6:
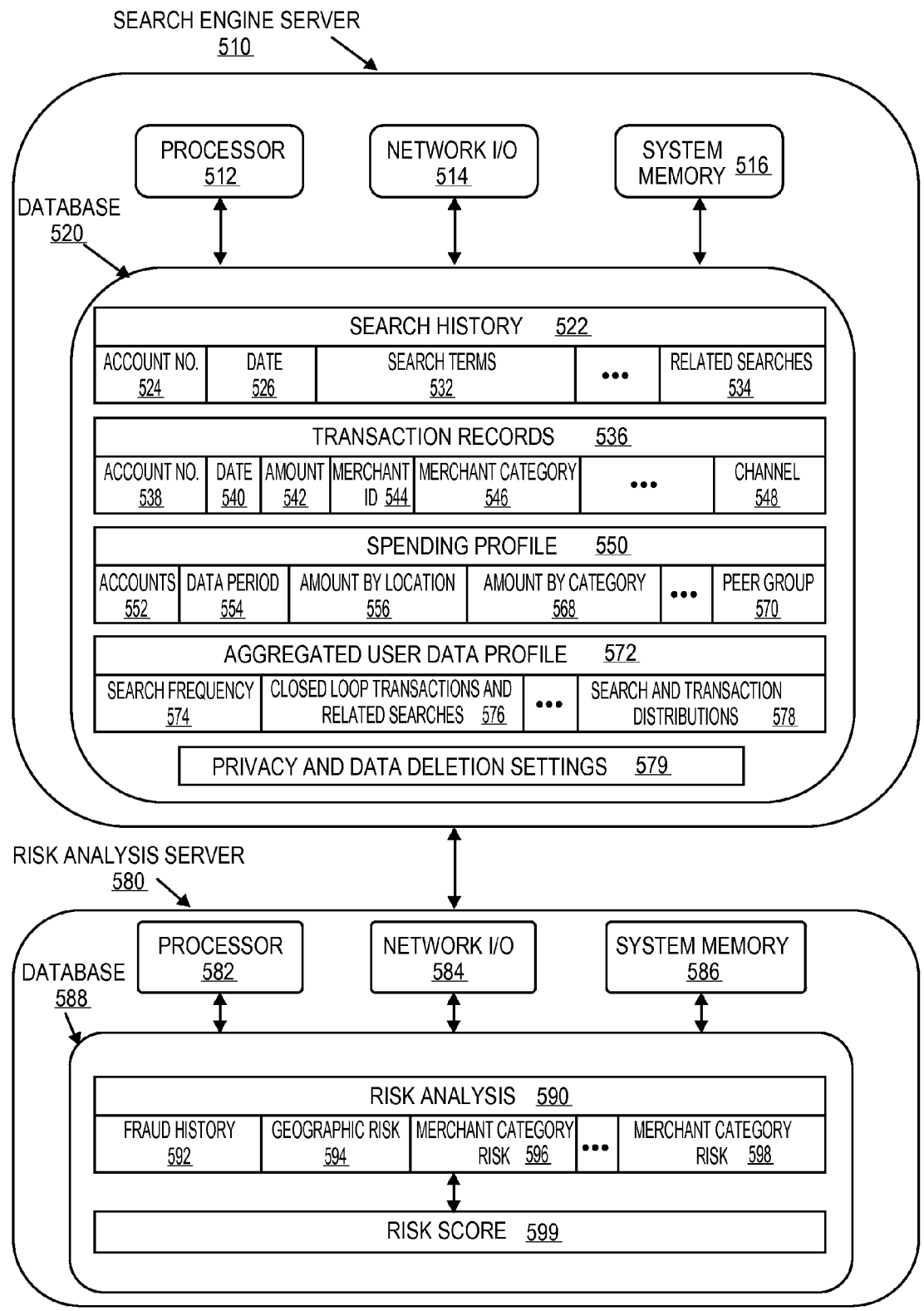
FIG. 6 shows a diagram of one aspect of a system according to one potential embodiment of the innovations presented herein.

The various participants and elements of the system shown in FIG. 1, 3, or 6, or described at any point herein may operate one or more computer apparatuses to facilitate the functions described herein. Any of the elements in FIG. 1 may use any suitable number of subsystems to facilitate the functions described herein. The various participants and elements of the system shown in the figures associated with the present innovations may operate one or more computers, computer apparatuses, or processing devices to facilitate the functions described herein. Such computer apparatuses or processing devices may be configured as individual servers, groups of servers, or virtual computing resources. Any of the elements in FIG. 1, 3, or 6 may use any suitable number of subsystems to facilitate the functions described herein. Additionally, elements of the mobile devices described throughout the descriptions of the present innovations may be structured according to FIG. 5 or in any other suitable configuration.

One non-limiting potential embodiment of such subsystems or components are shown in FIG. 5. The subsystems shown in FIG. 5 are interconnected via a system bus 475. Additional subsystems such as a printer 474, keyboard 478, fixed disk 479 (or other memory comprising computer readable media), monitor 476, which is coupled to display adapter 482, and others are shown. Peripherals and input/output (I/O) devices, which couple to I/O controller 471, can be connected to the computer system by any number of means known in the art, such as serial port 477. For example, serial port 477 or external interface 481 can be used to connect the computer apparatus to a wide area network such as the Internet, a mouse input device, or a scanner. Embodiments of external interfaces 481 typically include an Ethernet card, a modem (telephone, satellite, cable, ISDN), (asynchronous) digital subscriber line (DSL) unit, FireWire interface, USB interface, and the like. A server or computing device according to FIG. 5 may also include software that enables communications over a network such as the HTTP, TCP/IP, RTP/RTSP protocols, and the like. In alternative embodiments of the present invention, other communications software and transfer protocols may also be used, for example IPX, UDP or the like.

The interconnection via system bus allows the central processor 473 to communicate with each subsystem and to control the execution of instructions from non-transitory system memory 472 or the fixed disk 479, as well as the exchange of information between subsystems. The system memory 472 and/or the fixed disk 479 may embody a computer readable storage medium. In alternative embodiments, a computing device according to aspects of the innovations described herein may be embodied with only a portion of the elements described in FIG. 5, with additional elements, or with some elements duplicated. Additionally, in further embodiments, elements may be located remotely from each other, being connected by the Internet, a wide-area network, or some other connection that enables communication between the elements.

Additionally, for the purposes of the innovations herein, a server computer can be a powerful computer or a cluster of computers. For example, the server computer can be a large mainframe, a minicomputer cluster, or a group of servers functioning as a unit. In one example, the server computer may be a database server coupled to a Web server.

V. Search Engine and Risk Analysis Servers

FIG. 6 details one potential embodiment of a search engine server and a risk analysis server that may be implemented as part of a system for improved authentication using search technology. Search engine server 510 and risk analysis server 580 may be similar to the related elements shown in FIG. 3. Alternatively, aspects of search engine server 510 and risk analysis server 580 may be incorporated into other elements of a system, such as the inclusion of the functionality of risk analysis server 550 within a payment processing network such as payment processing network 150 of FIG. 1. Alternatively, in certain embodiment, servers 510 and 580 may be merged into a single server or server system sharing processor, network, and memory resources, with databases 520 and 588 merged into a single database.

In the embodiment of FIG. 6, search engine server 510 includes processor 512, network I/O 514, system memory 516, and database 520. Database 520 includes search history 522, transaction records 536, spending profile 550, aggregated user data profile 572, and privacy settings 579. In the embodiment of FIG. 6, search engine server 510 includes not only a connection to a user system to receive user search data, but also a connection to receive transaction data associated with accounts that are enrolled in a system for improved authentication using search technology. Such data may come directly from the user, or may come from any party to the authentication process, such as merchant 330, acquirer 340, payment processing network, or issuer 360 in the embodiment of FIG. 3. In one potential embodiment, the service is provided by an issuer, and the transaction data is provided to search engine 520 from the issuer via risk analysis server 588. Database 520 then includes information both from user searches and from user transactions. Search history 522 may include user search data associated with individual user searches. Search terms 532 may be stored in a database data structure along with an associated account number 524, and date 526 or date and time, and an association to related searches 534. The related searches may be identified by a linked list of search history 522 entries using similar keywords, by categories, or by any other means of grouping searches in search history 522.

Transaction records 536 may include record data received from the payment processing network or issuer as described above, and include an account number 538 such as a credit card number, debit card number, checking account number, or a plurality of account numbers. Transaction records 536 may further include a date 540, a transaction amount 542, a merchant ID 544, a merchant category 546, and a channel 548 identification. Such data may be structured as track 1 or track 2 magnetic stripe data format information related to a magnetic strip portable consumer device. Transaction records 536 may alternatively incorporate additional information not directly received from the specific transaction such as a merchant address or other information tangentially related to the transaction.

Spending profile 550 may then include history or profile data for user transactions. Spending profile 550 may include a list of account 552, a period for which the spending profile 550 entry is analyzing data, a total amount by location 556 entry, a total amount by category 568 entry, and an identified peer group 570. Alternatively, spending profile 550 may include other statistical data such as average spend amounts by time of year, location, or category, or multiple peer group identifications and comparisons. Aggregated user data profile 572 may include combinations of spending profile 550 information analyzed along with user search data. For example, a search frequency 574 may be stored and compared with information from spending profile 550. Closed loop transactions and related searches 576 may include associations between specific search history 522 entries and specific transactions from transaction records 536. Search and transaction distributions 578 may include average and standard deviation data for search and transaction frequencies with spending amounts or search volumes and durations.

Risk analysis server 580 includes processor 582, network I/O 584, system memory 586, and database 588. Database 588 may include risk analysis parameters 590 and risk score 599 information entries. Risk analysis parameters 590 may include fraud history 592. Since an account that has recently experienced fraud is less secure than one that has not, a history of reported fraud or insecurity will increase a risk level for an account or group of associated accounts. Risk analysis server 580 may also receive information from search engine server 510 to enable specific risk analysis parameters 590 associated with geography, merchant types, and merchant categories, and compare these with specific user searching and purchasing patterns to create geographic risk 594, merchant category risk 596, and merchandise category risk 598. Creation of these risk factors will typically involve receiving data via network I/O/584, calculating risk using processor 582 based on various history and calculated information from input data, and storing the results in system memory 586, which may be the location for database 588 storage structures for storing risk analysis parameters 590. The various risk analysis parameters 590 may then be condensed to a single risk score, or set or risk scores for use by a payment processing network or issuer in responding to an authentication request.

Privacy and data deletion settings 579 may include user or service selecting limits on data storage, preventing data from being stored indefinitely. These limits may be based on user privacy concerns, or may be set based on relevancy for risk scores for individual data elements. For example, if the search and transaction distributions 578 for a particular user indicate that the usage patterns of a user have shifted dramatically or are exceptionally stable, length of storage for data may be altered based on how such a distribution changes the relevance of particular elements to a current risk score. This enables privacy and data deletion settings to be dynamically determined based on a statistical characteristic of the user search data.

Figure 7:
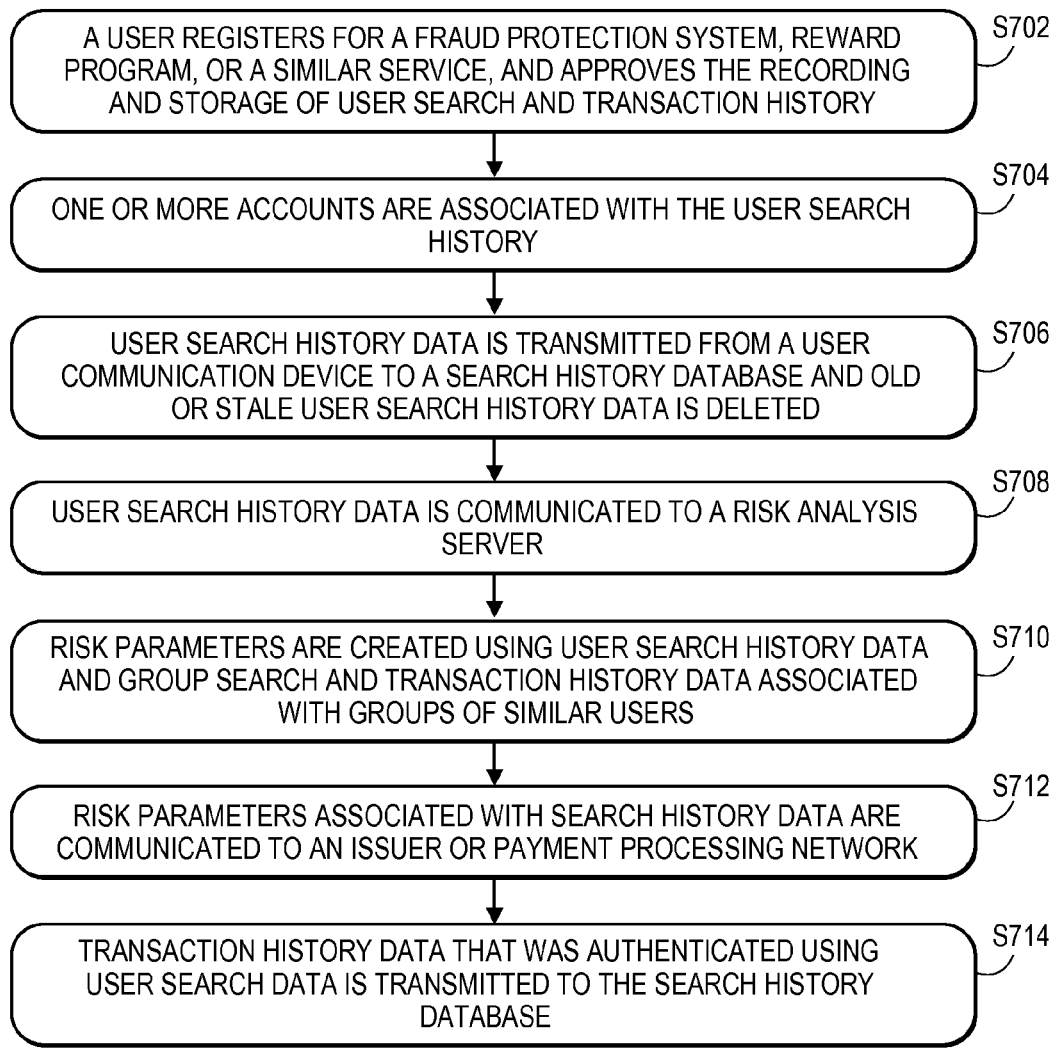
FIG. 7 shows a flowchart illustrating one potential embodiment of the innovations presented herein.

FIG. 7 describes a method of using search engine server 510 and risk analysis server 580 to create a risk score for use in a system for improved authentication using search technology. In step S702, a user registers for a fraud protection system, reward program, or a similar service operated through search engine 510, and approves the storage of user search data and user transaction data in database 520. In step S704, one or more accounts are associated with the user search data that is approved in step S702. In step S706, search engine server 510 receives search history data from a user communication device and stores the information in database 520. As part of the receipt of new information in step S706, privacy and data deletion settings 579 may be checked and data approaching a delete deadline may be identified as stale and deleted.

User search data may be analyzed or manipulated with other data to create performance metrics, and then in step S708, user search data is communicated to a risk analysis server 580. In step S710, risk parameters are created using the user search data along with other information such as similar data from groups identified as similar to the user of accounts associated with the a current set of user search data. In step S712, the risk parameters created by risk analysis server 580 are transmitted to a party that will use the parameters for risk analysis and/or transaction authentication. Step S712 may occur in response to a request for information in certain embodiments. In other embodiments, step S712 occurs whenever the risk parameters are updated, or at an other predetermined interval. Finally, in step S714, after an authentication occurs using the risk parameters from step S712, user transaction history data may be returned to search engine server 510. This data may be transmitted via risk analysis server 580, with risk score 599 being updated as the user transaction history data is received, or the user transaction history data may be transmitted directly to search engine 510, with risk score being updated as the updated transaction data flows through the process from search engine server 510 to risk analysis server 580 in a new iteration of step S708.

Various aspects of the present innovations may be implemented as software. Such software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
    receiving, at a server computer, an authorization request message, wherein the authorization request message requests authorization to conduct a transaction and was generated in response to an interaction between a user and a merchant;
    retrieving, by the server computer, search history data or search parameters relating to searches conducted by the user;
    after retrieving the search history data or search parameters, determining, by the server computer, a risk parameter associated with the transaction, wherein the risk analysis parameter is based on at least the search history data or search parameters;
    modifying the authorization request message to include the risk analysis parameter to create a modified authorization request message; and
    transmitting, by the server computer, the modified authorization request message to an issuer.

2. The method of claim 1 wherein the server computer is in a payment processing network that is configured to process credit and debit card transactions.

3. The method of claim 1 wherein the search history data or the search parameters comprises an indication that the user searched for the merchant, and wherein the authorization request message comprises an indicator for the merchant.

4. The method of claim 1 wherein the search history data or the search parameters comprises an indication that the user searched for the merchant, and wherein the authorization request message comprises an indicator for the merchant, and wherein the risk analysis parameter indicates that the transaction is low risk.

5. The method of claim 1 wherein the search history data or the search parameters comprises an indication that the user searched for the merchant, and wherein the authorization request message comprises an indicator for a different merchant, and wherein the risk analysis parameter indicates that the transaction is higher risk than if the authorization request message comprised an indicator for the merchant.

6. The method of claim 1 wherein the risk analysis parameter is a risk score.

7. The method of claim 1 wherein the authorization request message was generated by an access device or computer of the merchant, and wherein the authorization request message comprises a payment card account identifier.

8. The method of claim 1 further comprising:
receiving an authorization response message from the issuer, wherein the authorization response message comprises an indicator indicating that the issuer approved of the transaction.

9. The method of claim 1 wherein the merchant offers goods or services for sale on the Internet, and also offers goods or services for sale at a physical location.

10. The method of claim 1 wherein the search history data or the search parameters comprises an indication that the user searched for the merchant at a specific location, and wherein the authorization request message comprises a location indicator, wherein the location indicator corresponds to the specific location, and wherein the risk analysis parameter indicates that the transaction is low risk.

11. A system comprising:
a processor; and
a computer readable medium coupled to the processor, the computer readable medium code for causing the processor to implement a method comprising
receiving, at a server computer, an authorization request message, wherein the authorization request message requests authorization to conduct a transaction and was generated in response to an interaction between a user and a merchant,
retrieving, by the server computer, search history data or search parameters relating to searches conducted by the user,
after retrieving the search history data or search parameters, determining, by the server computer, a risk parameter associated with the transaction, wherein the risk analysis parameter is based on at least the search history data or search parameters,
modifying the authorization request message to include the risk analysis parameter to create a modified authorization request message, and
transmitting, by the server computer, the modified authorization request message to an issuer.

12. The system of claim 11 wherein the server computer is in a payment processing network that is configured to process credit and debit card transactions.

13. The system of claim 11 wherein the search history data or the search parameters comprises an indication that the user searched for the merchant, and wherein the authorization request message comprises an indicator for the merchant.

14. The system of claim 11 wherein the search history data or the search parameters comprises an indication that the user searched for the merchant, and wherein the authorization request message comprises an indicator for the merchant, and wherein the risk analysis parameter indicates that the transaction is low risk.

15. The system of claim 11 wherein the search history data or the search parameters comprises an indication that the user searched for the merchant, and wherein the authorization request message comprises an indicator for a different merchant, and wherein the risk analysis parameter indicates that the transaction is higher risk than if the authorization request message comprised an indicator for the merchant.

16. The system of claim 11 wherein the risk analysis parameter is a risk score.

17. The system of claim 11 wherein the authorization request message was generated by an access device or computer of the merchant, and wherein the authorization request message comprises a payment card account identifier.

18. The system of claim 11 further comprising:
receiving an authorization response message from the issuer, wherein the authorization response message comprises an indicator indicating that the issuer approved of the transaction.

19. The system of claim 11 wherein the merchant offers goods or services for sale on the Internet, and also offers goods or services for sale at a physical location.

20. The system of claim 11 wherein the search history data or the search parameters comprises an indication that the user searched for the merchant at a specific location, and wherein the authorization request message comprises a location indicator, wherein the location indicator corresponds to the specific location; and wherein the risk analysis parameter indicates that the transaction is low risk.

* * * * *